(12) United States Patent
Yamamoto

(10) Patent No.: US 7,343,145 B2
(45) Date of Patent: Mar. 11, 2008

(54) RADIO CONTROL SYSTEM FOR MODELS

(75) Inventor: Michio Yamamoto, Mobara (JP)

(73) Assignee: Futaba Corporation, Mobara-shi, Chiba-ken (JP)

( * ) Notice: Subject to any disclaimer, the term of this patent is extended or adjusted under 35 U.S.C. 154(b) by 450 days.

(21) Appl. No.: 11/050,235

(22) Filed: Feb. 3, 2005

(65) Prior Publication Data

US 2005/0181742 A1 Aug. 18, 2005

(30) Foreign Application Priority Data

Feb. 4, 2004 (JP) ............................. 2004-027864

(51) Int. Cl.
*H04B 1/06* (2006.01)
(52) U.S. Cl. .................. 455/260; 455/550.1; 455/119; 375/327
(58) Field of Classification Search ........ 455/255–260, 455/230, 234.1, 2, 235.1, 240.1, 250.1, 115.1, 455/115.4, 119, 126, 132, 133, 136, 256; 375/345, 221, 247, 324, 327
See application file for complete search history.

(56) References Cited

U.S. PATENT DOCUMENTS

| | | | | |
|---|---|---|---|---|
| 5,319,798 A | * | 6/1994 | Watanabe | ................... 455/76 |
| 5,459,760 A | * | 10/1995 | Watanabe | ................... 375/134 |
| 5,822,362 A | * | 10/1998 | Friedmann | ................... 375/130 |
| 6,430,217 B1 | * | 8/2002 | Suzuki et al. | ............... 375/219 |
| 6,466,803 B1 | * | 10/2002 | Gardner | ................... 455/553.1 |
| 6,609,010 B1 | * | 8/2003 | Dolle et al. | .............. 455/552.1 |
| 2002/0137469 A1 | * | 9/2002 | Yamaguchi et al. | ......... 455/78 |

FOREIGN PATENT DOCUMENTS

| | | |
|---|---|---|
| JP | 6-9697 | 2/1994 |
| JP | 6-31232 | 4/1994 |

* cited by examiner

*Primary Examiner*—Edward F. Urban
*Assistant Examiner*—Nhan T Le
(74) *Attorney, Agent, or Firm*—Quarles & Brady LLP

(57) ABSTRACT

In conventional radio controlled models, a receive frequency is changed with a changeover switch mounted in a receiver body. In the present invention, a frequency switching scheme, employing a radio system in which a transmitter switches the receive frequency, is provided. Using weak radio waves usable without authorization, the transmitter transmits frequency data set therein as a frequency switching signal to a receiver. In the receiver, the receive frequency is set to a predetermined weak radio wave frequency when the power source is turned on. Upon receiving the weak radio waves, the receiver reads the frequency data out of the set signal and stores it into the memory means. Thus, the frequency setting has been completed. When the receiver does not receive the frequency switching signal for a fixed period of time, it reads out the frequency data used previously from the data memory to start the receiving operation.

6 Claims, 2 Drawing Sheets

RADIO CONTROL SYSTEM FOR MODELS

CROSS REFERENCES TO RELATED APPLICATIONS

This application claims the priority benefit of Japanese Patent Application No. 2004-027864 filed on Feb. 4, 2004.

STATEMENT REGARDING FEDERALLY SPONSORED RESEARCH

Not Applicable.

BACKGROUND OF THE INVENTION

1. Field of the Invention

The present invention relates to a radio control device (gear) for remotely manipulating radio controlled models.

2. Description of the Prior Art

Nowadays, radio-control devices (hereinafter referred to as R/C devices) are used for various radio controlled models (hereinafter referred to as R/C models) such as model aircraft, model helicopters, model vehicles, model boats and others. For them, two types of main carrier wave modulation scheme, that is, AM (Amplitude Modulation) and FM (Frequency Modulation) are used or two types of main carrier wave modulation signal conversion scheme, that is, PPM (Pulse Position Modulation) and PCM (Pulse Code Modulation) are used.

Regarding the R/C devices, the frequency bands for carriers and frequencies in each frequency band, allowable in each country, are regulated by laws, statutes, and rules ("the Radio Law") specific to each country in which the devices are operated. For example, the frequency bands usable in Japan are 27 MHz band, 40 MHz band, and 72 MHz band, each in which plural frequencies are determined.

When plural radio controlled models are used in the same area at the same time, the frequency not used by other radio controlled models must be selected in order to avoid interference. Typically, a crystal oscillator (referred to as quartz) is changed to select a different band and change the carrier frequency.

Recently, the frequency synthesizer scheme employing the PLL (Phase Locked Loop) circuit generally used in the communication fields has been adopted and is in broad use. Such a frequency synthesizer scheme can set the carrier to different frequencies by changing the frequency division ratio. However, the use of the R/C device in the frequency synthesizer scheme depends on regulation by the Radio Law in each country. Moreover, even in countries allowing the use of the frequency synthesizer scheme, frequencies other than designated frequencies cannot be used.

Japanese Utility Model publication No. Zikkai-hei 6-31232, filed by the present applicant, discloses a conventional transmitter to solve the above-mentioned problem. The transmitter has a configuration in which a crystal high-frequency module or a PLL high-frequency module is attachable to or detachable from the transmitter. For that reason, in countries applying and not applying the frequency synthesizer scheme in compliance with different legal systems, a common transmitter can be used without preparing different transmitters.

The PLL high-frequency module has memory that stores frequency data to variably control the carrier wave frequency. Hence, when high-frequency modules, each having a memory that stores frequency data by country, are prepared, the frequency synthesizer scheme using a carrier wave of a predetermined frequency can be applied for the transmitter through an exchange of the module.

In the receiver, the crystal oscillator is replaced to avoid the interference of receiving frequencies possible in the same area, in a manner similar to that of the transmitter. However, since spare crystal oscillators have to be available, receivers in a frequency synthesizer scheme, each incorporating a PLL circuit, are being used widely. In that receiver, the frequency can be easily changed and adjusted by varying the frequency division ratio of the frequency divider through a changeover operation of a DIP switch disposed in the receiver body. However, while the radio controlled model is operating, the switch may change due to a function of some kind such as the vibration of an engine, thus varying the frequency division ratio. As a result, the receiving frequency can inadvertently switch over so that the radio-controlled model becomes uncontrollable during operation.

In order to solve such a problem, Japanese Utility Model No. Tokkai-hei 9-9697, filed by the present applicant, discloses a receiver for radio controlled models in a frequency synthesizer scheme using a conventional PLL circuit. In the receiver, two DIP switches, for example, which are disposed therein, selects a predetermined frequency from among predetermined plural sets of frequency data. When the power source is turned on, the receiver checks a usable frequency group and then captures the selected band information. The receiver determines whether or not the frequency data corresponding to the band information is a normal frequency. In the discrimination result, the frequency division ratio of the frequency divider in the PLL circuit is determined based on the frequency data stored in the memory. The frequency locked on based on the frequency division ratio is set to a fixed value as a receiving frequency until the power source is turned off at the next stage. For that reason, the possibility does not occur that the receiving frequency once set changes unintentionally due to disturbance such as the vibration or erroneous operation. As a result, the reliability can be improved.

In the radio controlled model in the frequency synthesizer scheme incorporating a PLL circuit, the receiver mounted in the radio controlled model is taken out to vary, for example, the receiving frequency. The switch such as a DIP switch disposed in the receiver body is manually operated to change the frequency division ratio. Thus the receiving frequency is changed.

The switch is disposed in the housing of the radio controlled model while the receiver is wrapped or covered with a vibration-proof and water-proof rubber. Thus, a change of receiving frequency data or a failure of the radio controlled model, caused by a changeover of the switch of the receiver due to conditions, such as vibrations of the engine in to the model body or water leakage, is prevented.

Such a configuration has a disadvantage in the frequency changing work. That is, when the receiving frequency is forced to change because a set frequency has been already used, the receiver is first taken out of the radio controlled model. Then, the vibration-proof or water-proof material such as rubber is uncovered to perform the frequency switching work. Finally, the receiver is again covered with the rubber and is stored inside the radio controlled model. This is troublesome and results in a time loss.

SUMMARY OF THE INVENTION

The present invention is made to solve the above-mentioned problems.

An object of the present invention is to provide a radio control system for models, which can simply switch the receiving frequency of a receiver, without taking out the receiver mounted in a radio model.

In an aspect of the present invention, a radio control system for models, comprises a transmitter and a receiver, in a frequency synthesizer scheme using a PLL circuit; the radio control system being capable of selecting a first frequency from among a group of frequencies when a radio model is operated, the first frequency being set as a transmission frequency of the transmitter and as a receiving frequency of the receiver, the frequency group being predetermined as usable frequencies for transmitting and receiving an operation signal for manipulating a radio controlled model; wherein, in order to set a transmission frequency of the transmitter and a receiving frequency of the receiver to the first frequency, the transmitter transmits a frequency set signal containing information on the first frequency to the receiver, a transmission frequency of the frequency set signal being set to a second frequency different from the first frequency.

The receiver previously sets a receiving frequency to the second frequency, and sets, after receiving the frequency set signal, the receiving frequency to the first frequency from among the group of frequencies based on the frequency set signal. The transmitter transmits the operation signal with the first frequency after a receiving frequency of the receiver is set to the first frequency. The receiver receives the operation signal to manipulate the radio controlled model.

Moreover, the transmitter sets a transmission signal to the second frequency at power-on and then transmits the frequency set signal to the receiver. The receiver sets a receiving frequency to the second frequency at power-on and thus can receive the frequency set signal. The receiver sets a receiving frequency to the second frequency for only a constant period of time at power-on.

Moreover, the transmitter uses the second frequency and uses weak radio waves usable without authorization when transmitting the frequency set signal containing information on the first frequency to the receiver.

In another aspect of the present invention, the transmitter includes operation signal generator means for generating the operation signal by an operation of an operation section; frequency set signal generator means for generating a frequency set signal corresponding to the first frequency selected from among the group of frequencies; memory means for storing first frequency data corresponding to the first frequency and second frequency data corresponding to a second frequency different from the first frequency set as a transmission frequency when the frequency set signal is transmitted; frequency switching controller means for reading out the second frequency data from the memory means and outputting the frequency set signal from the frequency set signal generator means or for reading out the first frequency data from the memory means based on the frequency set signal and outputting the operation signal from the operation signal generator means; transmission frequency setting means for setting a transmission frequency based on first frequency data or second frequency data read out from the memory means; and signal transmitter means for transmitting the frequency set signal or the operation signal, with a transmission frequency set by the transmission frequency setting means.

The signal transmitter means controls transmission power of radio waves transmitted based on a command from the frequency setting controller means when transmitting the frequency setting signal.

The receiver includes memory means for storing the first frequency data and the second frequency data; frequency switching controller means for reading out the second frequency data and the first frequency data based on the frequency signal transmitted from the transmitter, out of the memory means; receiving frequency setting means for setting a receiving frequency based on the first frequency data or the second frequency data read out from the frequency switching controller means; and signal receiver means for receiving the frequency set signal or the operation signal transmitted from the transmitter, with a receiving frequency set by the receiving frequency setting means.

The present invention employs a frequency switching scheme in compliance with the radio scheme capable of switching the frequency from the transmitter side, without taking the receiver out of the inside of a radio controlled model. This can eliminate the frequency switching work and time loss. For that reason, the user can comfortably enjoy playing with a radio controlled model.

Moreover, in the frequency setting, the frequency switching signal is transmitted and received using weak radio waves so that the frequency selection is performed arbitrarily. Using a frequency for weak radio waves, which is different from the frequency used in the radio control device, minimizes interference to other radio controlled models in the vicinity.

BRIEF DESCRIPTION OF THE DRAWINGS

This and other objects, features, and advantages of the present invention will become more apparent upon reading of the following detailed description and drawings, in which.

DESCRIPTION OF THE EMBODIMENTS

Figure 1A:
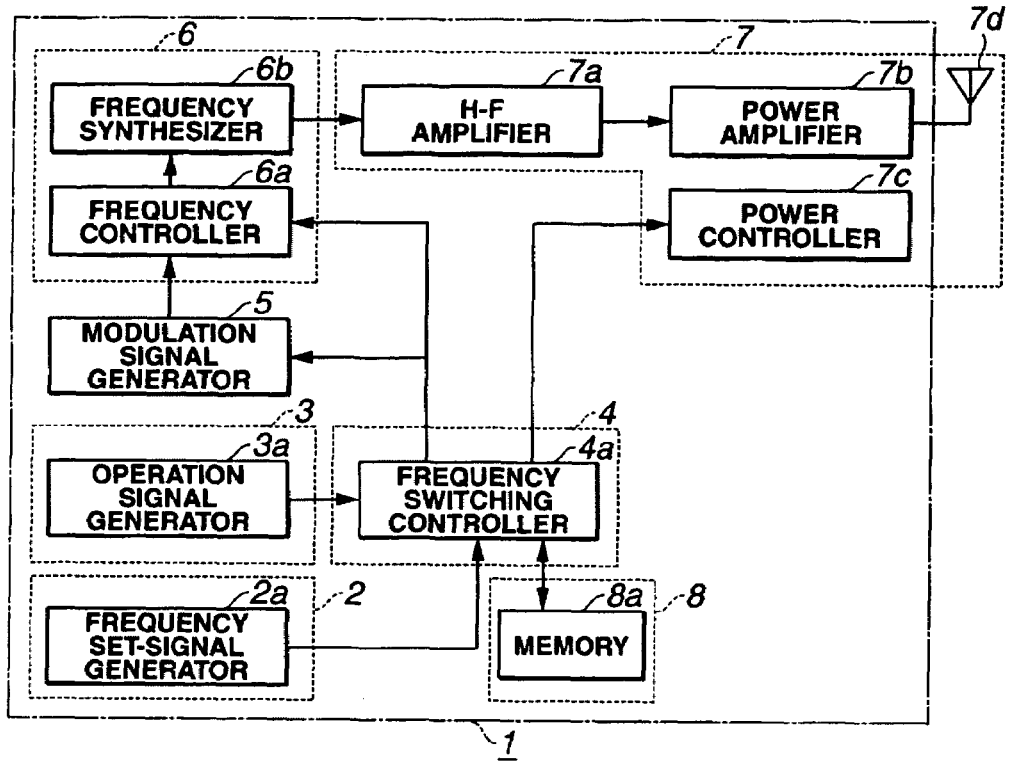
FIG. 1(a) is a block diagram schematically illustrating a transmitter, according to an embodiment of the present invention.
Figure 1B:
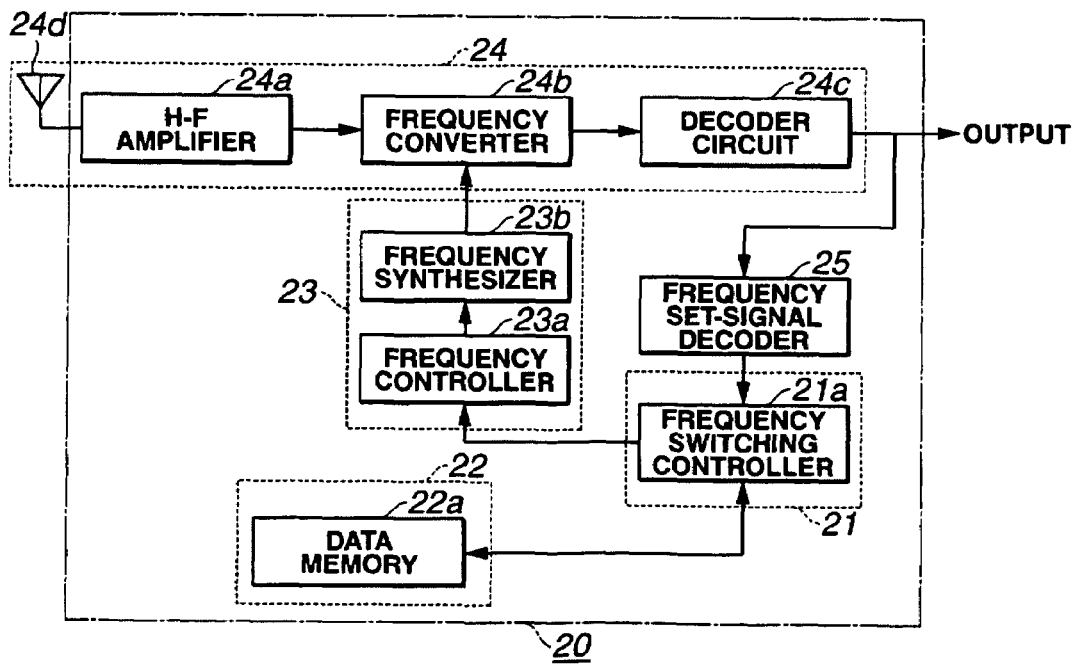
FIG. 1(b) is a block diagram schematically illustrating a receiver, according to the embodiment of the present invention.

A radio control system according to an embodiment of the present invention will be explained by referring to the attached drawings. FIG. 1 is a block diagram illustrating a radio control system according to an embodiment of the present invention. FIG. 1(a) is a block diagram illustrating a transmitter and FIG. 1(b) is a block diagram illustrating a receiver. The transmitter and the receiver are explained below respectively.

Transmitter:

In the embodiment of FIG. 1(a), the transmitter 1 includes frequency set signal generator means 2, operation signal generator means 3, frequency switching controller means 4, transmission frequency setting means 6, signal transmitter means 7, memory means 8, and modulation signal generator 5.

As shown in FIG. 1(a), the frequency set signal generator means 2 includes a frequency set signal generator 2a. The operation signal generator means 3 includes an operation signal generator 3a. The frequency switching controller means 4 includes a frequency switching controller 4a. The transmission frequency setting means 6 includes a frequency controller 6a and a frequency synthesizer 6b. The signal transmitter means 7 consists of a high-frequency amplifier 7a, a power controller 7b, a power amplifier 7c, and a transmitter antenna 7b. The memory means 8 includes a memory 8a.

The transmitter operates differently in a frequency setting mode (a power-on time) which indicates the time when the transmitter is powered on and in an operation mode (a normal operation time) which indicates the time when a normal radio control is operated. The mode changeover switch (not shown), which is attached to the transmitter, can be suitably operated to change over the mode. The operation in each mode of each operational element will be explained below.

The memory 8a, which is a data signal rewritable memory, previously stores frequency data corresponding to each country and ID information added to the receiver.

The frequency set signal generator 2a operates at a power-on time. When a set key, for example, a rotary switch, attached to the transmitter is operated or rotated to set (or select) the band information corresponding to a predetermined frequency, the frequency set signal generator 2a generates the frequency set signal (a frequency switching signal) corresponding to the band information set at that time and then outputs it to the frequency switching controller 4a. Preferably, the set key is attached to the transmitter 1 in a place not adversely affecting the operation of an operation stick on the transmitter 1, and can be arbitrarily determined in its mounting position and shape.

The operation signal generator 3a operates in a normal operation time. The operation signal generator 3a converts an operation signal from an analog signal to a digital signal and then outputs it to the frequency switching controller 4a. The operation signal corresponds to an operation amount or ON/OFF of an operation stick or each switch, attached corresponding to each channel in the transmitter.

The frequency switching controller 4a performs the following three operations at a power-on time, as follows:
(a) The frequency switching controller 4a reads frequency data for weak radio waves out of the memory 8a and then outputs it to the frequency controller 6a;
(b) The frequency switching controller 4a outputs a power control signal for weak radio waves to the power amplifier 7b; and
(c) The frequency switching controller 4a outputs a frequency set signal from the frequency set signal generator 2a to the modulation signal generator 5.

In a normal operation, the frequency switching controller 4a reads frequency data (frequency data for operation signal transmission) corresponding to a frequency set signal input from the frequency set signal generator 2a at a power-on time, out of the memory 8a and then outputs it to the frequency controller 6a. The frequency switching controller 4a outputs an operation signal from the operation signal generator 3a to the modulation signal generator 5.

The term, weak radio waves, means a feeble radio output usable without authorization. Because the weak radio waves are set to a given frequency, a frequency different from the frequency used for the radio control device can be used so as not to interfere with radio controlled models controlled by other radio controlled devices in the vicinity. For that reason, frequencies which are not used for the radio control device are previously set for weak radio waves and are stored in the memory 8a and the data memory 22a, which is memory means 22 in the receiver (to be described later).

Plural frequencies for weak radio waves may be stored in the memory 8a and the data memory 22a. The user may select the frequency suitable for the use environment. In that case, the switch that selects the frequency for weak radio waves is attached to the transmitter and the receiver, so that a frequency for weak radio waves can be selected by suitably operating the switch. Frequencies other than frequencies used in the radio control device can be used arbitrarily. Preferably, respective operation elements are standardized to avoid a large sized or complicated radio controlled device. For that reason, it is preferable to use the frequency very close to the frequency band, which is allowed to use for radio control devices.

The modulation signal generator 5 modulates the frequency set signal output from the frequency switching controller 4a at a power-on time and outputs the modulated frequency signal to the frequency controller 6a. Moreover, at a normal operation, the modulation signal generator 5 modulates an operation signal output from the frequency switching controller 4a and outputs the modulated operation signal to the frequency controller 6a.

The frequency controller 6a performs lock-on of the oscillator frequency of the frequency synthesizer 6b at a power-on time, based on the frequency data for weak radio waves output from the frequency switching controller 4a. The frequency controller 6a controls the modulation signal generator 5 to output the frequency set signal to the frequency synthesizer 6b.

In a normal operation, the frequency controller 6a locks on the oscillation frequency of the frequency synthesizer 6b, based on the frequency data output from the frequency switching controller 4a. The frequency controller 6a controls the modulation signal generator 5 to output the operation signal to the frequency synthesizer 6b.

At a power-on time, the frequency synthesizer 6b oscillates the frequency set signal input from the modulation signal generator 5 through the frequency controller 6a at a frequency locked on by the frequency controller 6a and then outputs it to the high-frequency amplifier 7a. In normal operation, the frequency synthesizer 6b oscillates the operation signal input from the modulation signal generator 5 through the frequency controller 6a at a frequency locked on by the frequency controller 6a and then outputs it to the high-frequency amplifier 7a.

The high-frequency amplifier 7a amplifies the frequency set signal output from the frequency synthesizer 6b at a power-on time and outputs it to the power amplifier 7c. In normal operation, the high-frequency amplifier 7a amplifies the operation signal output from the frequency synthesizer 6b and outputs it to the power amplifier 7c.

The power controller 7b operates at a power-on time and controls the output of the power amplifier 7c to be within specified values of weak radio waves according to the power control signal for weak radio waves input from the frequency switching controller 4a.

The power amplifier 7b amplifies the frequency set signal input from the high-frequency amplifier 7a at a power-on time, based on the power control signal for weak radio waves to the power controller 7b, and transmits it as a frequency set signal using weak radio waves to the transmitter antenna 7d. In normal operation, the power amplifier 7b amplifies an operation signal input from the high-frequency amplifier 7a within a specified value of radio waves usable when the radio controlled model is manipulated, and thus transmits it as operation data to the transmitter antenna 7d.

Figure 2:
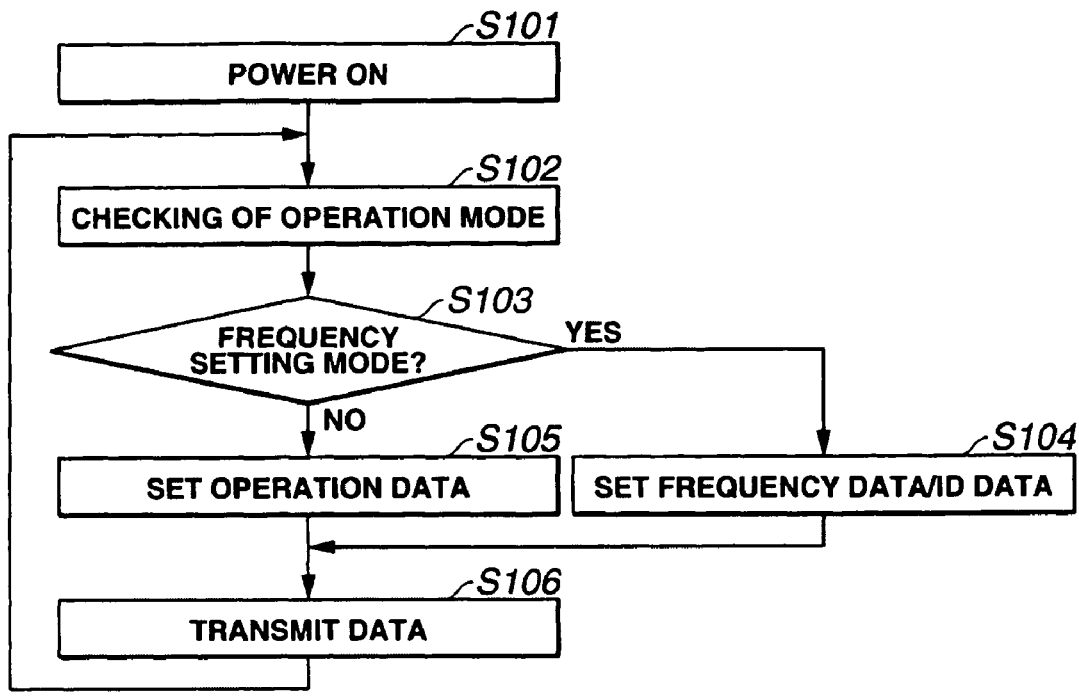
FIG. 2 is a flowchart illustrating the operation of the transmitter.

Next, the operation of the transmitter will be described below by referring to the flowchart in FIG. 2.

First, when the set key provided to the transmitter is set to a predetermined frequency (band), the transmitter is powered on. Thus, the transmitter outputs a frequency set signal according to the frequency (band) set by the frequency set signal generator 2a (S101).

Next, the frequency switching controller 4a checks the operation mode (S102). In the frequency set mode (S103), the frequency switching controller 4a determines whether or not the frequency set mode (S103) is a power-on time (Yes in S103) or a normal operation time (No in S103).

At the power-on time (Yes in S103), the frequency switching controller 4a adds the ID code read out of the memory 8a to the frequency data (first frequency data) selected from the memory 8a and modulates the result and then outputs it as the frequency set signal.

Moreover, the frequency data for weak radio waves (second frequency data) is read out of the memory 8a. The frequency controller 6a locks on the oscillation frequency of the frequency synthesizer 6b based on the frequency data for weak radio waves. The frequency set signal is oscillated with the locked-on frequency (a second frequency). The high frequency amplifier 7a amplifies the frequency set signal. The power controller 7c controls the frequency set signal to be within a specified value according to the power control signal for weak radio waves from the frequency switching controller 4a (S104).

The ID code to be added means a code for preventing an erroneous operation in the use of the same radio devices. A device identification code, that is, an ID code, is added to the transmitter/receiver system. Thus, the transmitter and the receiver can operate only by using the same identification code. In more detail, the transmitter of the present embodiment includes plural memories, each which previously stores an ID code set for each receiver. The ID code can be changed according to an opponent receiver. Therefore, in radio devices made in compliance with the same specification, a single transmitter can deal with plural receivers, each having a different ID code. This feature improves the convenience of users. Here, the method of using ID codes has been described but any erroneous recognition prevention method may be used.

In the normal operation (No in S103), the voltage (in an analog value) of a potentiometer connected to the stick or switch provided corresponding to each channel of the transmitter is converted into a digital signal acting as an operation signal and then the operation signal is modulated. The oscillation frequency of the frequency synthesizer is locked on based on the selected frequency data (first frequency). The operation signal is oscillated with the frequency locked on by the frequency synthesizer 6b. The high-frequency amplifier 7a amplifies the operation signal and then outputs it as a high frequency signal (S105).

Then, the power amplifier 7b amplifies the high frequency signal. The transmitter antenna 7d transmits the frequency set signal or the operation signal. Thereafter, the operational flow returns to the operation mode checking step (S106). That operation is repeated until the power source is turned off or the battery becomes dead.

Receiver:

In the embodiment shown in FIG. 1(b), the receiver 20 includes frequency switching controller means 21, memory means 22, receiving frequency setting means 23, signal receiver means 24, and frequency set signal decoder 25. As shown in FIG. 1(b), the frequency switching controller means 21 includes a frequency switching controller 21a. The memory means 22 includes a memory 22a. The receiving frequency setting means 23 includes a frequency controller 23a and a frequency synthesizer and 23b. The signal receiver means 24 consists of a high-frequency amplifier 24a, a frequency converter 24b, a decoder 24c, and a receiver antenna 24d.

Like the transmitter, the receiver operates differently in a frequency setting mode (a power-on time) and in an operation mode (a normal operation time). The operation of each operation element in each mode will be described below.

The data memory 22a stores data signals in a rewritable mode, in a manner similar to that of the memory 8a, and previously stores frequency data corresponding to each country and an ID code set to each receiver.

In a power-on time, the frequency switching controller 21a reads the frequency data for weak radio waves out of the data memory 22a and outputs it to the frequency controller 23a. In normal operation mode, the frequency switching controller 21a reads frequency data corresponding to a frequency set signal input by the frequency set signal decoder 25 out of the data memory 22a and outputs it to the frequency controller 23a.

In a power-on time, the data memory 22a outputs frequency data for weak radio waves in response to a request from the frequency switching controller 21a. In a normal operation time, the data memory 22a outputs frequency data corresponding to a frequency set signal from among sets of stored frequency data, in response to a request from the frequency switching controller 21a.

In a power-on time, the frequency controller 23a controls the frequency synthesizer 23b to lock on the oscillation frequency of the frequency synthesizer 23b, based on the frequency data for weak radio waves from the frequency switching controller 21a. In a normal operation time, the frequency controller 23a controls the frequency synthesizer 23b to lock on the oscillation frequency of the frequency synthesizer 23b, based on the frequency set data from the frequency switching controller 21a.

In a power-on time, the frequency synthesizer 23b outputs a frequency signal for weak radio waves to the frequency converter 24b with the frequency locked on by the frequency controller 23a. In a normal operation time, the frequency synthesizer 23b outputs an oscillation frequency signal to the frequency converter 24b with the frequency locked on by the frequency controller 23a.

In a power-on time, the high frequency amplifier 24a amplifies the frequency set signal received via the receiver antenna 24d and outputs it to the frequency converter 24b. In a normal operation time, the high frequency amplifier 24a amplifies an operation signal received via the receiver antenna 24d and outputs it to the frequency switching converter 24b.

In a power-on time, the frequency converter 24b converts (mixes) the frequency set signal amplified by the high-frequency amplifier 24a with the frequency signal for weak radio waves oscillated by the frequency synthesizer 23b and outputs it to the decoder 24c. In a normal operation time, the frequency converter 24b converts (mixes) the operation signal amplified by the high-frequency amplifier 24a with the frequency signal oscillated by the frequency synthesizer 23b and outputs it to the decoder 24c.

In a power-on time, the decoder circuit 24c decodes the frequency set signal output from the frequency converter 24b and outputs it to the frequency set signal decoder 25. In a normal operation time, the decoder circuit 24c decodes an operation signal output from the frequency converter 24b as a servo drive signal to control each element of a radio controlled model and then outputs it to the servo drive circuit in each channel.

The frequency set signal decoder 25 operates in a power-on mode. The frequency set signal decoder 25 decodes the frequency set signal (containing ID information) input from the decoder circuit 24 and performs error decision and outputs a frequency set signal matching all check items to the frequency switching controller 21a.

Figure 3:
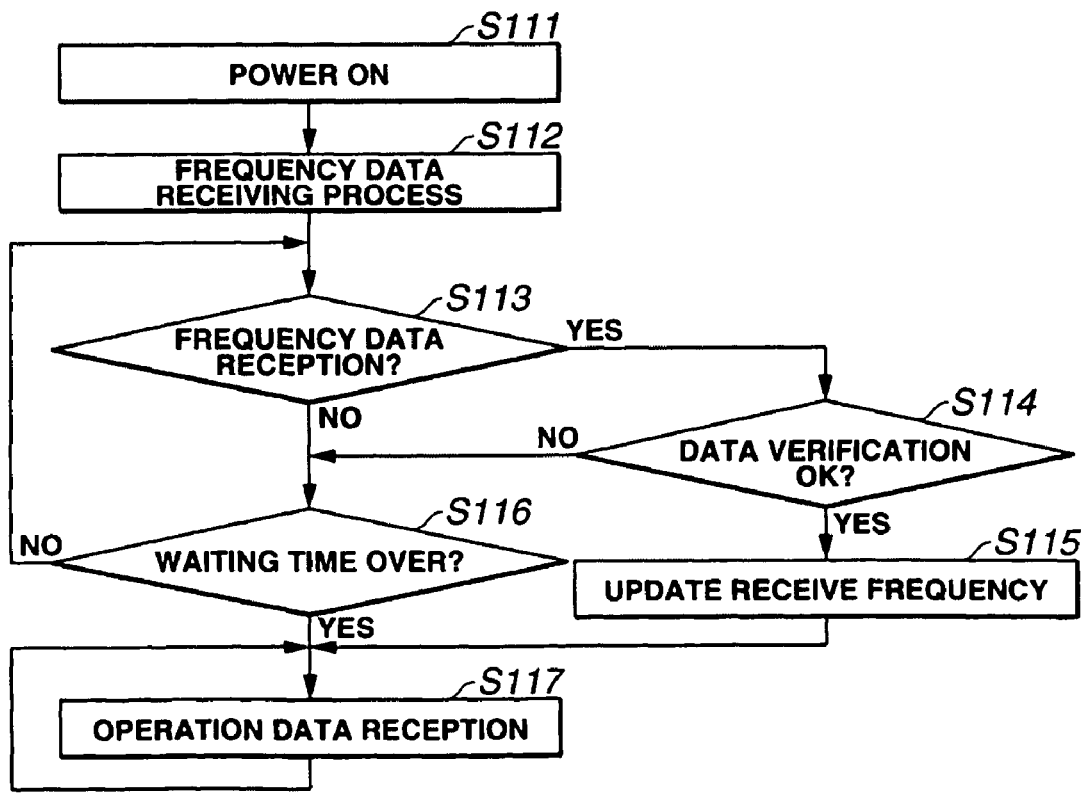
FIG. 3 is a flowchart illustrating the operation of the receiver.

Next, an operation of the receiver will be described below by referring to the flowchart in FIG. 3.

First, the receiver is powered on (S111). Upon turning on the power source, the frequency data (second frequency data) for weak radio waves stored in the data memory 22a is read out. The oscillation frequency of the frequency synthesizer 23b is locked on based on the frequency data. The frequency synthesizer 23b oscillates a frequency signal for weak radio waves with the locked-on frequency and outputs it to the frequency converter 24b (S112).

Then, the receiver waits to receive the frequency set signal (frequency switching signal) carried with weak radio waves of the second frequency (S113). The receiving time of the frequency switching signal has a lapse of a fixed period of time from the turning on of the power source of the receiver, for example, a receive waiting time of several tens seconds. The receiving operation is ceased after a lapse of the waiting time.

When the frequency switching signal of weak radio waves is received via the receiver antenna 24d (Yes in S113), the high-frequency amplifier 24a amplifies the frequency switching signal. The frequency converter 24b converts (mixes) the amplified signal with the frequency signal for weak radio waves oscillated by the frequency synthesizer 23b. The decoder circuit 24c decodes the frequency switching signal. The ID code (or a device identification code) for erroneous recognition prevention added to the frequency switching signal) is subjected to data verification (S114).

When the data verification is matched (Yes in S114), the decoder circuit 24c decodes the frequency switching signal as a frequency set signal. The data memory 22a sends out frequency data (first frequency data) corresponding to the frequency set signal while it stores the frequency data read out. The frequency synthesizer 23b locks on its oscillation frequency based on the frequency set data and outputs the frequency signal oscillated with the locked-on frequency to the frequency converter 24b. Thus, the setting of the receiving frequency (first frequency) has completed (S115).

The receiver includes further a LED (Light Emitting Diode). When the receiver has completely set the frequency for reception based on the frequency set signal (frequency switching signal) from the transmitter, the LED blinks a predetermined number of times. If the data verification fails (No in S114) or the frequency switching signal by weak radio waves are not received (No in S113), the receiver continues waiting until the frequency switching signal of weak radio waves is received if the waiting time is not over (No in S116).

When the frequency switching signal is not received during the waiting time period (Yes in S116), the data memory 22a sends out the previously used frequency data and outputs the frequency signal oscillated based on the frequency data (as a receiving frequency (first frequency)) to the frequency converter 24b. Thus, the receiving operation begins.

After the frequency data to be transmitted and the frequency data to be received are set, the following operation is performed.

The receiver antenna 24d receives an operation signal transmitted from the transmitter. The high frequency amplifier 24a amplifies the operation signal. The frequency converter 24b converts (mixes) the amplified signal with the frequency signal oscillated by the frequency synthesizer 23b. Thus, the decoder circuit 24c decodes the converted signal as a servo drive signal controlling each element in a radio controlled model and then outputs it to the servo drive circuit in each channel (S117).

As described above, the radio control system for models according to the present invention can select received frequencies, with the receiver mounted in the radio control model. This feature can eliminate the troublesome and time loss at the time of switching the frequency.

Because a frequency switching signal at the start-up of the power source is transmitted and received with weak radio waves, it is preferable to perform the transmission and reception at, for example, a close distance of about 3 m.

In the above embodiment, when the receiver has completely set its receiving frequency based on the frequency set signal (frequency switching signal) from the transmitter, the LED provided on the receiver flashes a predetermined number of times to inform the user of the completion of frequency setting. However, if the same effect is obtained without limiting only to the embodiment, an electronic buzzer, for example, may produce an electronic sound or a drive signal may be transmitted only to a specific servo to implement a specific operation. In this operation, the user can ascertain more clearly that the received frequency has been completely set in the receiver.

What is claimed is:

1. A radio control system for models, comprising,
   a transmitter and a receiver, in a frequency synthesizer scheme using a PLL circuit;
   said radio control system being capable of selecting a first frequency from among a group of frequencies when a radio model is operated, said first frequency being set as a transmission frequency of said transmitter and as a receiving frequency of said receiver, said frequency group being predetermined as usable frequencies which transmits and receives an operation signal for manipulating a radio controlled model;
   wherein, in order to set a transmission frequency of said transmitter and a receiving frequency of said receiver to said first frequency, said transmitter transmits a frequency set signal containing information on said first frequency to said receiver, a transmission frequency of said frequency set signal being set to a second frequency different from said first frequency;
   wherein said receiver previously sets a receiving frequency to said second frequency, and sets, after receiving said frequency set signal, said receiving frequency to said first frequency from among said group of frequencies based on said frequency set signal;
   wherein said transmitter transmits said operation signal with said first frequency after a receiving frequency of said receiver is set to said first frequency;
   wherein said receiver receives said operation signal to manipulate said radio controlled model.

2. The radio control system for models defined in claim 1, wherein said transmitter sets a transmission signal to said second frequency at power-on and then transmits said frequency set signal to said receiver; and wherein said receiver sets a receiving frequency to said second frequency at power-on and thus can receive said frequency set signal.

3. The radio control system for models defined in claim 1, wherein said receiver sets a receiving frequency to said second frequency for only a constant period of time at power-on.

4. The radio control system for models defined in claim 1, wherein said transmitter uses said second frequency and uses weak radio waves usable without authorization when transmitting said frequency set signal containing information on said first frequency to said receiver.

5. A radio control system for models, comprising:
a transmitter and a receiver, in a frequency synthesizer scheme using a PLL circuit;
said radio control system being capable of selecting a first frequency from among a group of frequencies when a radio model is operated, said first frequency being set as a transmission frequency of said transmitter and as a receiving frequency of said receiver, said frequency group being predetermined as usable frequencies when transmits and receives an operation signal for manipulating a radio controlled model;
said transmitter including:
operation signal generator means for generating said operation signal by an operation of an operation section;
frequency set signal generator means for generating a frequency set signal corresponding to said first frequency selected from among said group of frequencies;
memory means for storing first frequency data corresponding to said first frequency and second frequency data corresponding to a second frequency different from said first frequency set as a transmission frequency when said frequency set signal is transmitted;
frequency switching controller means for reading out said second frequency data from said memory means and outputting said frequency set signal from said frequency set signal generator means or for reading out said first frequency data from said memory means based on said frequency set signal and outputting said operation signal from said operation signal generator means;
transmission frequency setting means for setting a transmission frequency based on first frequency data or second frequency data read out from said memory means; and
signal transmitter means for transmitting said frequency set signal or said operation signal, with a transmission frequency set by said transmission frequency setting means;
said receiver including:
memory means for storing said first frequency data and said second frequency data;
frequency switching controller means for reading out said second frequency data and said first frequency data based on said frequency signal transmitted from said transmitter, out of said memory means;
receiving frequency setting means for setting a receiving frequency based on said first frequency data or said second frequency data read out from said frequency switching controller means; and
signal receiver means for receiving said frequency set signal or said operation signal transmitted from said transmitter, with a receiving frequency set by said receiving frequency setting means.

6. A radio control system for models defined in claim 5, wherein said signal transmitter means controls transmission power of radio waves transmitted based on a command from said frequency setting controller means when transmitting said frequency setting signal.

* * * * *